US011909719B1

(12) United States Patent
Kramer et al.

(10) Patent No.: US 11,909,719 B1
(45) Date of Patent: Feb. 20, 2024

(54) MANAGING THE ALLOCATIONS AND ASSIGNMENTS OF INTERNET PROTOCOL (IP) ADDRESSES FOR COMPUTING RESOURCE NETWORKS

(71) Applicant: Amazon Technologies, Inc., Seattle, WA (US)

(72) Inventors: Jonathan Paul Kramer, Arlington, VA (US); Michael Erik Untereiner, Washington, DC (US); Samuel Lough, Alexandria, VA (US); John Jeffrey Schlachtenhaufen, Arlington, VA (US); Masood Karimi, Alexandria, VA (US); Eric Andrew Rubin-Smith, Fairfax, VA (US); Joshua D Leaverton, Herndon, VA (US); Shovan Kumar Das, Medina, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/535,498

(22) Filed: Nov. 24, 2021

(51) Int. Cl.
  *H04L 61/5053* (2022.01)
  *H04L 61/5007* (2022.01)
  (Continued)

(52) U.S. Cl.
  CPC ...... *H04L 61/5053* (2022.05); *H04L 41/0686* (2013.01); *H04L 61/5007* (2022.05); *H04L 61/5061* (2022.05)

(58) Field of Classification Search
  None
  See application file for complete search history.

(56) References Cited

U.S. PATENT DOCUMENTS 6,246,670 B1 * 6/2001 Karlsson ............ H04L 61/5053
  370/338
9,813,374 B1 * 11/2017 Magerramov ...... H04L 61/5007
  (Continued)

FOREIGN PATENT DOCUMENTS

EP    3105902 B1 *  9/2018  .......... H04L 61/1511
WO   WO-9921379 A1 *  4/1999  ....... H04L 29/12216

OTHER PUBLICATIONS

RIPE, "IPv4 Address Allocation and Assignment Policies for the RIPE NCC Service Region", Jul. 2019 (ripe-725); Retrieved online on Dec. 14, 2022 from https://www.ripe.net/publications/docs/ripe-725. (Year: 2019).*

*Primary Examiner* — Dhairya A Patel
*Assistant Examiner* — Sandarva Khanal
(74) *Attorney, Agent, or Firm* — Lee & Hayes P.C.

(57) ABSTRACT

Techniques and technologies for an Internet Protocol (IP) address management (IPAM) system to track and manage IP address workflows in a network. The IPAM system can be used to define and enforce management policies or rules regarding IP address management, such as allocation policies, refill policies, and so forth. For instance, the IPAM system can enforce allocation policies that define rules to allow or deny allocation of IP addresses based on types of resources for which the IP addresses are requested, registered user accounts that are requesting the IP addresses, the purpose of the resources receiving the IP addresses, and so forth. Additionally, the IPAM system can enforce refill policies that define rules for replenishing inventories of IP addresses that have been allocated for different domains in the network. The IPAM system can improve the management of IP address workflows by enforcing policy and tracking IP address workflows in networks.

18 Claims, 14 Drawing Sheets

(51) Int. Cl.
*H04L 61/5061* (2022.01)
*H04L 41/0686* (2022.01)

(56) References Cited

U.S. PATENT DOCUMENTS

| | | | | |
|---|---|---|---|---|
| 2002/0143968 | A1* | 10/2002 | Banerjee | H04L 67/14 709/245 |
| 2003/0056008 | A1* | 3/2003 | Russell | H04L 61/5092 709/245 |
| 2003/0115246 | A1* | 6/2003 | Mahon | H04L 61/5007 709/200 |
| 2005/0071493 | A1* | 3/2005 | Lee | H04L 43/028 709/232 |
| 2005/0152395 | A1* | 7/2005 | Hales | H04L 12/2856 370/465 |
| 2006/0026289 | A1* | 2/2006 | Lyndersay | H04L 61/5014 709/227 |
| 2006/0075140 | A1* | 4/2006 | Sobel | H04L 63/105 709/245 |
| 2006/0126636 | A1* | 6/2006 | Dooley | H04L 61/5061 370/254 |
| 2009/0217350 | A1* | 8/2009 | Manning | H04L 63/102 726/3 |
| 2014/0052860 | A1* | 2/2014 | Duggal | H04L 61/2514 709/225 |
| 2014/0280902 | A1* | 9/2014 | Szamonek | H04L 61/5007 709/224 |
| 2015/0067819 | A1* | 3/2015 | Shribman | H04L 67/60 709/218 |
| 2016/0234161 | A1* | 8/2016 | Banerjee | H04L 67/10 |

* cited by examiner

MANAGING THE ALLOCATIONS AND ASSIGNMENTS OF INTERNET PROTOCOL (IP) ADDRESSES FOR COMPUTING RESOURCE NETWORKS

BACKGROUND

Computer networks are sets of interconnected computing devices that communicate with each other using communication protocols over digital connections. Various communication protocols exist that enable computing devices to communicate by defining rules for how to package data, encrypt data, transmit data, receive data and so forth. To ensure that data traffic is routed and communicated through networks to the correct destination devices, the Internet Protocol (IP) provides an addressing system where computing devices are provided with unique addresses, called IP addresses. When computing devices join networks, they are provided unique IP addresses that enable them to effectively communicate traffic with other devices over the networks. Similarly, when computing devices leave the networks, they release their IP addresses which can then be re-allocated for use by future devices. To ensure that data is communicated to the correct devices, computing devices are generally provided unique, non-overlapping IP addresses to avoid problems with routing and communication of data.

Thus, every computing device, resource, and workload connected to a network depends on its IP address to communicate. The explosive growth of network-connected mobile devices and Internet-of-Things (IoT) devices, along with the rapid shift in workloads to the cloud, requires organizations and entities to plan, track, and manage IP addresses at large scales. Organizations that manage networks must keep track of information associated with potentially hundreds of thousands of IP addresses, including the inventory of used and unused IP addresses, subnetworks, routing domains, security settings, and so forth. This task can be complex and can lead to latency in allocating IP addresses to new devices, IP address conflicts, resource connectivity issues and application downtime, and other issues. Additionally, it can be difficult to identify and address the issues caused by IP address mismanagement.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
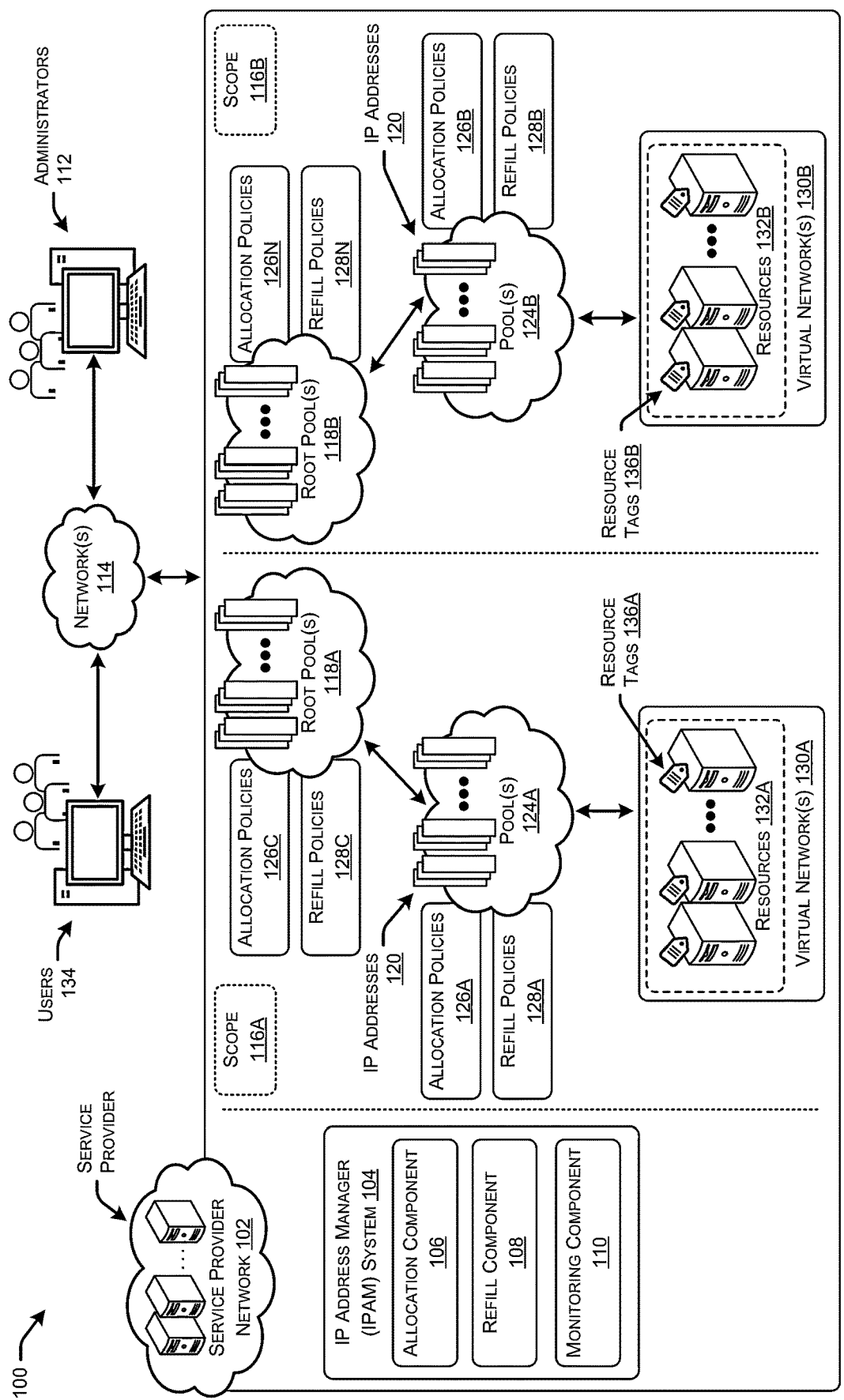
FIG. 1 illustrates a system-architecture diagram of an example environment in which an IP address management (IPAM) system manages the allocation of IP address for resources, and further manages how pools of IP addresses are refilled from other pools of IP addresses.

This disclosure describes techniques implemented by an IP address management (IPAM) system to track and manage IP address workflows in a network. The IPAM system can be used to define and enforce management policies or rules regarding IP address management, such as allocation policies, refill policies, and so forth. For instance, the IPAM system can enforce allocation policies that define rules to allow or deny allocation of IP addresses based on types of resources for which the IP addresses are requested, registered user accounts that are requesting the IP addresses, the purpose of the resources receiving the IP addresses, and so forth. Additionally, the IPAM system can enforce refill policies that define rules for replenishing inventories of IP addresses that have been allocated for different domains in the network. The IPAM system can improve the management of IP address workflows by enforcing policy and tracking IP address workflows in networks.

In some examples, the IPAM system may be provided by, and managed by, a service provider network (e.g., cloud provider platform) that provides computing resources to users. For instance, users may register with the service provider network to host networks of resources in the service provider network. Network administrators for the networks may register for use of the IPAM system in order to begin automating IP address workflows in their network(s).

Network administrators can enroll for use of the IPAM system and begin to define how to allocate their inventory of IP addresses for resources in their network. The network administrators may initially create various virtualized domains that can be used to allocate groupings of IP addresses. For instance, a network administrator may use the IPAM system to create IP spaces for individual networks, referred to herein as "scopes." Network administrators can define scopes for each network that defines the total IP space allocated for that network. By providing scopes, the IPAM system allows network administrators to reuse IP address spaces across multiple networks. However, because a network cannot have overlapping IP addresses on multiple resources, the scopes allow for reuse of IP address spaces across unconnected networks.

After creating scopes, network administrators may define groupings of IP addresses that are allocated for different resource groups, different teams in an organization, and so forth. These groups of IP addresses, often referred to herein as "pools" or "address groups," may include collections of contiguous IP address ranges (e.g., Classless Inter Domain Routing (CIDR) blocks) that are allocated or partitioned for use by different entities. For example, the network administrator may define a pool of IP addresses that are usable by a production team in an organization, and define another pool of IP addresses that are only usable by a developer team in the organization, and so forth. By providing pools, the IPAM system allows network administrators to apply policy on a pool-by-pool basis, thereby allowing network administrators to manage organizational teams differently, resource types differently, user accounts differently, and so forth.

As an example, the network administrators are then able to define allocation policies for the pools of IP addresses which define rules for how the IP addresses are allocated to different resources, user accounts, and so forth. For instance, an allocation policy may be used to define (i) what user accounts are allowed to request and use IP addresses from certain pools, (ii) minimum and maximum amounts of IP addresses (e.g., CIDR blocks) that can be allocated from pools, (iii) what resource types are permitted to use IP addresses from pools, and so forth. In this way, the network administrators may define and attach different allocation policies across their pools in order to treat organizational entities, resource types, etc., differently regarding IP address allocation. However, by automating the allocation of IP addresses according to a defined policy, the IPAM system reduces the latency in providing IP addresses when requested, the chances of overlapping IP addresses, and the chance of other errors occurring when allocating IP addresses from pools.

As IP addresses are withdrawn or allocated from pools, the inventory of available IP addresses may diminish. To prevent pools from exhausting available IP addresses, the network administrators may further define refill policies for the pools that provide rules regarding how pools replenish their IP address supply. For instance, network administrators may define refill policies that indicate minimum thresholds (e.g., 5% available, 1,000 IP addresses available, etc.) at which to replenish IP address supply, parent pools from which to withdraw IP addresses to refill the pools, amounts of IP addresses withdrawn when replenishing IP address supply, and so forth. Similarly, network administrators can define refill policies for pools that define who can refill from the pools and how many IP addresses can be taken from the pools. For instance, the network administrators can list what child pools are permitted to refill from a particular parent pool, minimum, maximum, and default amounts of IP addresses that can be withdrawn, frequency at which IP addresses can be withdrawn, and so forth.

The IPAM system can use these policies, along with other policies such as routing policies, security policies, etc., and begin monitoring the IP address workflows in one or more network scopes for organizations or entities. In some instances, monitoring the IP addresses in a network includes evaluating the policies against the actual state of the IP addresses in a network to determine compliance. For instance, the IPAM system may determine that an IP address has been allocated from a pool to a resource type that is restricted in an allocation policy from using IP addresses from that pool. As another example, the IPAM system may determine that a particular user has been requesting use of IP addresses from one or more pools at a frequency that violates a permissible frequency defined by allocation policies. In such examples, the IPAM system may take various automated actions when IP address usage is out of compliance. For example, the IPAM system may output various types of alerts to network administrators that indicate what resources or IP address workflows have been identified as being non-compliant. As another example, the IPAM system may automatically take corrective actions, such as locking out a user account (or script) from requesting additional IP addresses for a period of time, causing non-compliant resources to release IP addresses, move resources and/or IP addresses between pools, and so forth.

In some examples, out-of-band changes can result in IP addresses being allocated to resources in a network without knowledge of the IPAM system. However, through the monitoring techniques described herein (e.g., monitoring traffic), the IPAM system may detect the unmanaged IP address and determine to which pool the IP address belongs. For instance, the IPAM system may determine which pool is provided use of an IP address range (e.g., CIDR block) in which the unmanaged IP address belongs. In addition to using the IP address range of pools to determine where an unmanaged IP address belongs, the IPAM system may use other information to find the appropriate pool, such as resource tags on the resource, a region in which the resource is located, size of IP blocks that are attached to the resource, etc. The IPAM system may then onboard the IP address into the appropriate pool and begin monitoring the use of the IP address (e.g., release of the IP address by the resource, purpose for using the IP address, etc.).

The techniques described herein improve the functioning of computing networks in various ways, such as by improving IP address allocation and workflows in networks. Using the IPAM system, IP addresses can be allocated to resources with less latency and according to allocation policy. Further, the IPAM system acts as a single source of truth for IP address manage which reduces errors during IP assignments, overlapping IP address issues, and other issues with IP address management. Additionally, the IP system collects IP-address information across all resources and accounts for a network that is used for tracking IP address utilization, troubleshooting and auditing IP address issues, and other IP address management workflows.

The techniques described herein are generally described with respect to a service provider network, such as a cloud provider network or platform. However, the techniques are generally applicable for any network, such as on-premise networks, hybrid networks, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example environment in which an IP address management (IPAM) system manages the allocation of IP address for resources, and further manages how pools of IP addresses are refilled from other pools of IP addresses.

As illustrated, a service provider network 102 may be operated and/or managed by a service provider. The service provider network 102 may provide various services to users to fulfil their computing resource needs, such as cloud-based computing resources. For example, the service provider network 102 may provide cloud-based, scalable, and network accessible compute power services, storage services, database services, and/or other services. Users may utilize user devices to subscribe for use of the computing resources and/or services provided by the service provider network 102.

The service provider network 102 may span across different geographic regions, and include or be associated with a computing-resource network that includes clusters of managed computing resources (e.g., servers) stored in data centers located across the different geographic regions. In this way, users who have subscribed for use of the network-based services supported by computing resources in the data centers need not invest in and maintain the computing infrastructure required to implement the various services that they may need. In some examples, users of the service provider network 102 may access or utilize computing resources of the computing devices in the data centers located in different geographic regions such that users located in these different geographic regions are provided with access to these resources and services.

Generally, the computing resources may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing resources may be various types of computing devices, such as devices that have different chip set generations, are from different vendors, have different hardware architectures, and so forth.

Thus, the computing resources can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

In some examples, the service provider network 102 may offer or support an IPAM system 104 that may be used to track and manage IP addresses in networks of the users. The IPAM system 104 may include an allocation component 106 that enables users to create allocation policies for managing their IP address inventory. Further, the IPAM system 104 may include a refill component 108 that enables users to define refill policies for managing how their pools of IP addresses are refilled when inventory is low or below a set threshold. Additionally, the IPAM system 104 may include a monitoring component 110 that performs monitoring techniques to determine whether IP addresses are used or unused, if the used IP addresses are compliant with policies, and so forth.

Network administrators 112 can enroll for use of the IPAM system 104 and begin to define how to allocate their inventory of IP addresses 120 for resources 132 in their network. The network administrators 112 may initially create various virtualized domains that can be used to allocate groupings of IP addresses 120. For instance, a network administrator may use IPAM system 104 to create IP spaces for individual networks, or scopes 116A and 116B. Generally, a scope 116 is an IP space for a single network and enables the reuse of IP addresses 120 across multiple unconnected networks. The network administrators 112 can define scopes 116 (and/or IPAM system 104 automatically determines scopes 116) for each network that defines the total IP space allocated for that network. By providing scopes 116, the IPAM system 104 allows network administrators 112 to reuse IP address spaces across multiple networks. However, because a network cannot have overlapping IP addresses on multiple resources, the scopes 116 allow for reuse of IP address spaces across unconnected networks.

After creating scopes, network administrators 112 may define groupings of IP addresses that are allocated for different resource groups, different teams in an organization, and so forth. These groups of IP addresses are referred to herein as pools 124A, 124B and 118. Generally, the pools 124A/124B/118 may include collections of contiguous IP address ranges (e.g., Classless Inter Domain Routing (CIDR) blocks) that are allocated or partitioned for use by different entities. For example, the network administrator 112 may define a pool 124 of IP addresses 120 that are usable by a production team in an organization, and define another pool 124 of IP addresses 120 that are only usable by a developer team in the organization, and so forth. By providing pools, the IPAM system 104 allows network administrators 112 to apply policy on a pool-by-pool basis, thereby allowing network administrators 112 to manage organizational teams differently, resource types differently, user accounts differently, and so forth.

As an example, the network administrators 112 are able to define allocation policies 126 for the pools 124 of IP addresses 120 which define rules for how the IP addresses 120 are allocated to different resources 132, user accounts, and so forth. For instance, an allocation policy 126 may be used to define (i) what user accounts are allowed to request and use IP addresses 120 from certain pools 124, (ii) minimum and maximum amounts of IP addresses 120 (e.g., CIDR blocks) that can be allocated from pools 124, (iii) what resource types are permitted to use IP addresses 120 from pools 124, and so forth. In this way, the network administrators 112 may define and attach different allocation policies 126 across their pools 124/118 in order to treat organizational entities, resource types, etc., differently regarding IP address 120 allocation. However, by automating the allocation of IP addresses 120 according to defined policy, the IPAM system 104 reduces the latency in providing IP addresses 120 when requested, the chances of overlapping IP addresses 120, and the chance of other errors occurring when allocating IP addresses 120 from pools 124/118.

Various types of different resources 132A/132B can be allocated IP addresses 120. Generally, a resource 132 is any type of entity that can be allocated an IP address 120, including hardware devices (e.g., servers, routers, switches, VLANs, etc.), and software components, such as virtual machines, containers, subnets, applications, services, and/or any other type of computing resource. In some instances, the resources 132 may be arranged in virtual networks, such as virtual private clouds (VPCs). As illustrated, the resources 132 may be tagged with resource tags 136 that help categorize the resources 132 into resource types. Generally, the resources tags 136 are metadata assigned to the resources 132 and include a user-defined key and value. The resource tags 136 can be used to categorize resources 132 by purpose, owner (e.g., user account), environment, or other criteria.

In addition to defining allocation policies, the refill component 108 may enable the administrators 112 to define refill policies 128. As IP addresses 120 are withdrawn or allocated from pools 124/118, the inventory of available IP addresses 120 may diminish. To prevent pools 124/118 from exhausting available IP addresses 120, the network administrators 112 may define refill policies 128 that provide rules regarding how pools 124/118 replenish their IP address 120 supply. For instance, network administrators 112 may define refill policies 128 that indicate minimum thresholds (e.g., 5% available, 1,000 IP addresses available, etc.) at which to replenish IP address 120 supply, parent pools from which to withdraw IP addresses 120 to refill the pools (e.g., pools 124 refill from root pool 118), amounts of IP addresses 120 withdrawn when replenishing IP address 120 supply, and so forth. Similarly, network administrators 112 can define refill policies 128 for pools 124/118 that define who can refill from the pools 124/118 and how many IP addresses 120 can be taken from the pools 124/118. For instance, the network administrators 112 can list what child pools 124 are permitted to refill from a particular parent/root pool 118, minimum, maximum, and default amounts of IP addresses 120 that can be withdrawn, frequency at which IP addresses 120 can be withdrawn, and so forth. Generally, each scope 116 can include root pools 118 from which the pools 124 can withdraw or be allocated IP addresses 120. The root pools 118 may be associated with respective allocation policies 128 that are usable to define what pools 124 can withdraw IP addresses 120, and according to what rules the IP addresses 120 can be withdrawn.

The IPAM system 104 can use these policies, along with other policies such as routing policies, security policies, etc., and begin monitoring the IP address 120 workflows in one or more network scopes 116 for organizations or entities. In some instances, monitoring the IP addresses 120 in a network includes evaluating the policies against the actual state of the IP addresses 120 in the network to determine compliance. For instance, the monitoring component 110 may determine that an IP address 120 has been allocated from a pool 124 to a resource type that is restricted in an allocation policy 126 from using IP addresses 120 from that pool 124. As another example, the monitoring component 110 may determine that a particular user 134 has been requesting use of IP addresses 120 from one or more pools 124/118 at a frequency that violates a permissible frequency defined by allocation policies 126. In such examples, the monitoring component 110 may take various automated actions when IP address 120 usage is out of compliance. For example, the monitoring component 110 may output various types of alerts to network administrators 112 that indicate what resources or IP address workflows have been identified as being non-compliant. As another example, the monitoring component 110 may automatically take corrective actions, such as locking out a user account 134 (or script) from requesting additional IP addresses 120 for a period of time, causing non-compliant resources to release IP addresses 120, move resources 132 and/or IP addresses 120 between pools 118/124, and so forth.

In some examples, out-of-band changes can result in IP addresses 120 being allocated to resources 132 without knowledge of the IPAM system 104. However, through the monitoring techniques performed by the monitoring component 110 (e.g., monitoring traffic), the monitoring component 110 may detect the unmanaged IP address 120 and determine to which pool 118/124 the IP address 120 belongs. For instance, the monitoring component 110 may determine which pool 118/124 is provided use of an IP address range (e.g., CIDR block) in which the unmanaged IP address 120 belongs. In addition to using the IP address range of pools 118/124 to determine where an unmanaged IP address 120 belongs, the monitoring component 110 may use other information to find the appropriate pool 118/124, such as resource tags 136 on the resource 132, a region in which the resource 132 is located, size of IP blocks that are attached to the resource 132, etc. The monitoring component 110 may then onboard the IP address 120 into the appropriate pool 118/124 and begin monitoring the use of the IP address 120 (e.g., release of the IP address 120 by the resource 132, purpose for using the IP address 120, etc.).

Users 134 and administrators 112 may create user accounts with the service provider to utilize the resources and services of the service provider network 102. The Users 134 and administrators 112 may utilize their devices to communicate over one or more networks 114 (e.g., WANs, PANs, LANs, etc.) with the service provider network 102. The user devices may comprise any type of computing device configured to communicate over network(s) 114, such as mobile phones, tablets, laptop computers, desktop computers, televisions, servers, and/or any other type of computing device. The users 134 and administrators 112 may interact with the service provider network 102, via their user account and/or one or more user portals (e.g., web console, command line interface (CLI), application programming interface (API), etc.). The user portals may provide input data to the IPAM system 104 to perform various techniques described herein for managing networks, defining policies, and so forth.

Generally, the IPAM system 104, and components thereof, may comprise software, firmware, and/or other logic that is supported one computing device, or across more computing devices in the service provider network 102. Additionally, the IPAM system 104 may comprise a system of other devices.

Figure 2:
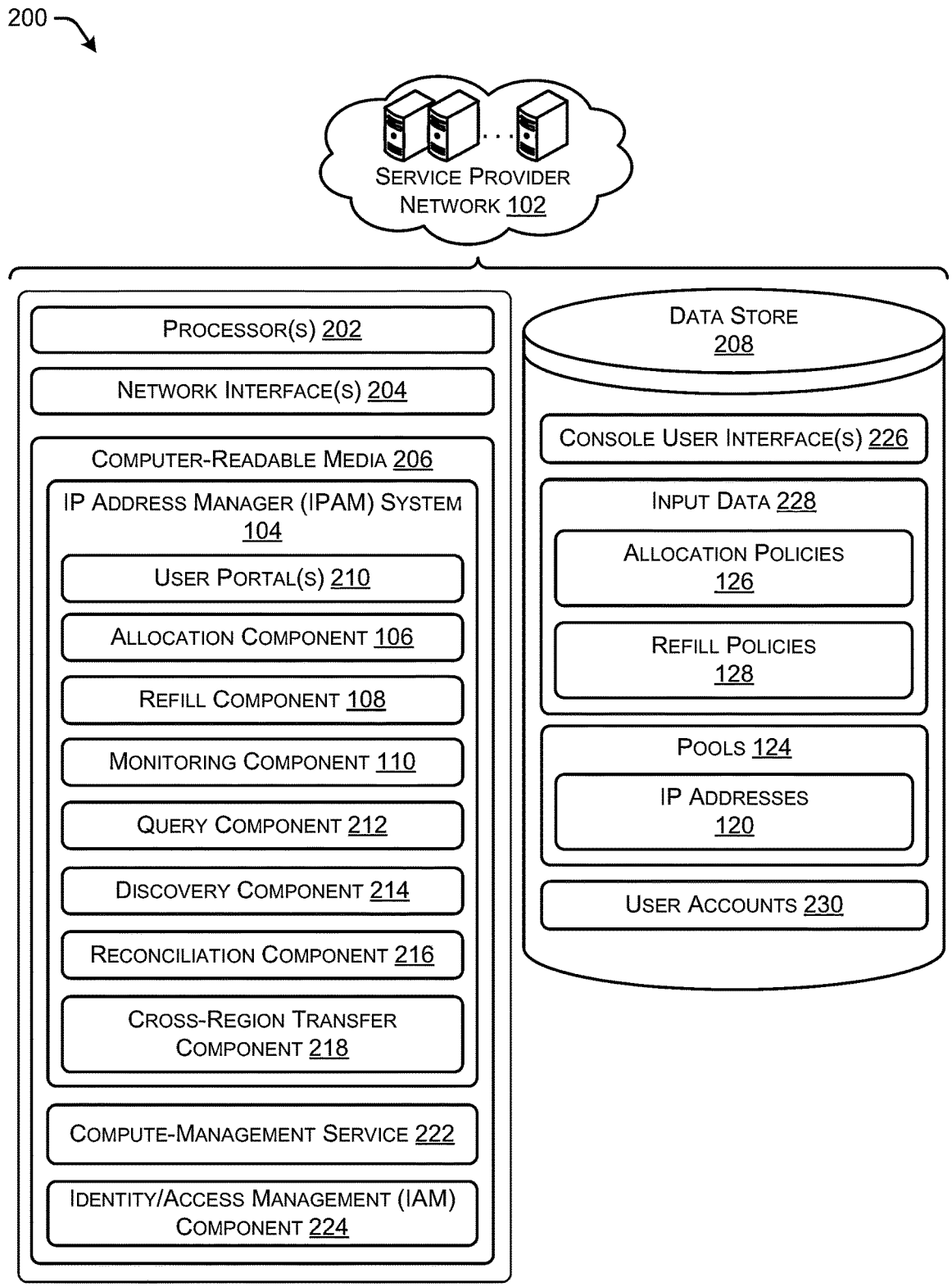
FIG. 2 illustrates a component diagram of example components of a service provider network that includes an IPAM system that tracks and manages IP address workflows in a network.

FIG. 2 illustrates a component diagram 200 of example components of a service provider network 102 that includes an IPAM system 104 that tracks and manages IP address workflows in a network.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the IPAM system 104 described herein. For instance, the computer-readable media 206 may store and/or provide user portal(s) 210 through which users 134 and administrators 112 can provide input via their user accounts and user devices. In some examples, the user portal(s) 210 include an interface through which users 134 and administrators 112 can define policies or rules for their IP address workflows. Additionally, the user portal(s) 210 may present one or more console user interface(s) 214 (or UIs) through which the users 134 and administrators 112 may provide input data that defines or describes policies for their IP addresses 120. The user portal(s) may receive calls from APIs, CLIs, SDKs, and/or other electronic means or methods.

The computer-readable media 206 may further store a query component 212 that allows users 134 and administrators 112 to submit queries that are exposed by the IPAM system 104. The query component 212 may allow for queries such as longest-prefix match queries, historical searches, drilling down by CIDR into a scope 116, visualizing what is in a pool 118/124, and so forth.

The computer-readable media 206 may further store a discovery component 214 that is generally is in charge of finding out about all of the resources 132, sublets, and so on that are in a users' organization, and sending that data to the reconciliation component 216. The reconciliation component 216 may be configured to map the truth from the discovery component 214 into actions on the IPAM system's 104 data store 208. For example, during an initial onboarding, the reconciliation component 216 might backfill a group or bunch of allocations into various pools. As another example, when a resource 132 is deleted, the reconciliation component 216 will release the allocation object from the IPAM system 104. As a third example, if during onboarding the discovery component 214 finds that there are two resources 132 that have overlapping space, the reconciliation component 216 may create a notification or alert that is sent to an administrator 112 to notify them that something is wrong, and an action may need to be taken. The computer-readable media may further store a cross-region transfer component 218 that initiates cross-regional transfers of resources 132 and/or IP addresses 120.

The computer-readable media 206 may further store code for a compute-management service 222, which may be implemented by one, or multiple, computing devices of the service provider network 102. Generally, the compute-management service 222 may be a service of the service provider network 102 that provides secure, resizable compute capacity and manages the computing resources of the computing-resource network. The compute-management service 222 may be referred to in various implementations as an elastic compute service, a virtual machines service, a computing cloud service, a compute engine, or a cloud compute service. In some examples, the compute-management service 222 may perform various functions for managing the computing-resource network, such as provisioning resources 132, migrating resources 132, providing auto-scaling for fleets of resources 132, configuring resources 132, and/or performing any other functions for managing the resources 132. In some instances, the compute-management service 222 may receive commands from the IPAM system 104 for managing the resources 132.

To utilize the services provided by the service provider network 102, administrators 112 and users 134 may register for an account with the service provider network 102. For instance, administrators 112 and users 134 may utilize a user device to interact with an identity and access management (IAM) component 224 that allows the administrators 112 and users 134 to create user accounts 230 with the service provider network 102. Generally, the IAM component 224 may enable the administrators 112 and users 134 to manage their IP address 120 allocation and computing resources 132 securely. Using the IAM component 224, the administrators 112 and users 134 may manage their IP address 120 allocations and assignments as described herein.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3A:
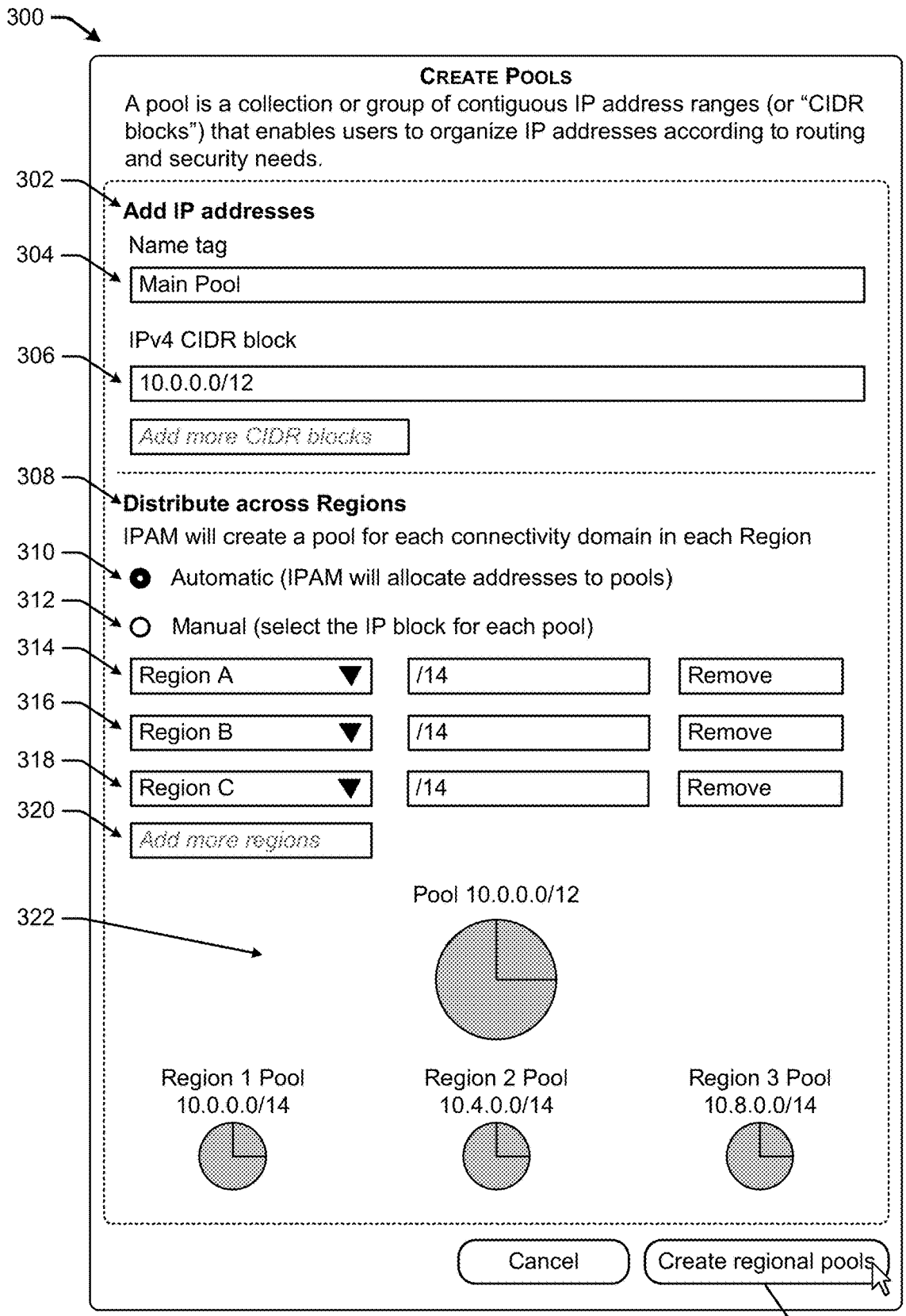
FIG. 3A illustrates a graphical user interface through which an administrator of a network can create regional pools of IP addresses.

FIG. 3A illustrates a graphical user interface 300 through which an administrator 112 of a network can create regional pools of IP addresses.

It should be understood that the GUI 300 is merely illustrative and any type of user interface, or combination of user interfaces, may be utilized to prompt an administrator 112 creating regional pools, which may be root pools 118 in some instances. Additionally, any type of input mechanism may be used to receive input that can be used to make selections.

As illustrated, the administrator 112 may be presented with an add IP addresses field 302 in which the administrator 112 may define a name tag 304 for the pool they are creating, as well as assign the IPv4 (and/or IPv6) CIDR blocks 306 to the pool. The administrator 112 may also be presented with a distribute across regions field 308 in which the administrator 112 can select between an automatic option 310 where IPAM system 104 will allocated addresses to the pools, or a manual option 312 where the administrator 112 can manually select IP blocks for each pool. As illustrated in this example, there is region A 314, region B 316, and region C 316, and the administrator 112 would like IPAM system 104 to create a pool for each connectivity domain for the regions. In the illustrated example, the regional pools are provided with IP addresses 120 using CIDR blocks of 10.0.0.0/14 from the root or parent pool.

The GUI 302 may further illustrate a pool diagram 322 that illustrate what pools are going to be created by the administrator 112 upon selecting the create regional pools option 326.

Figure 3B:
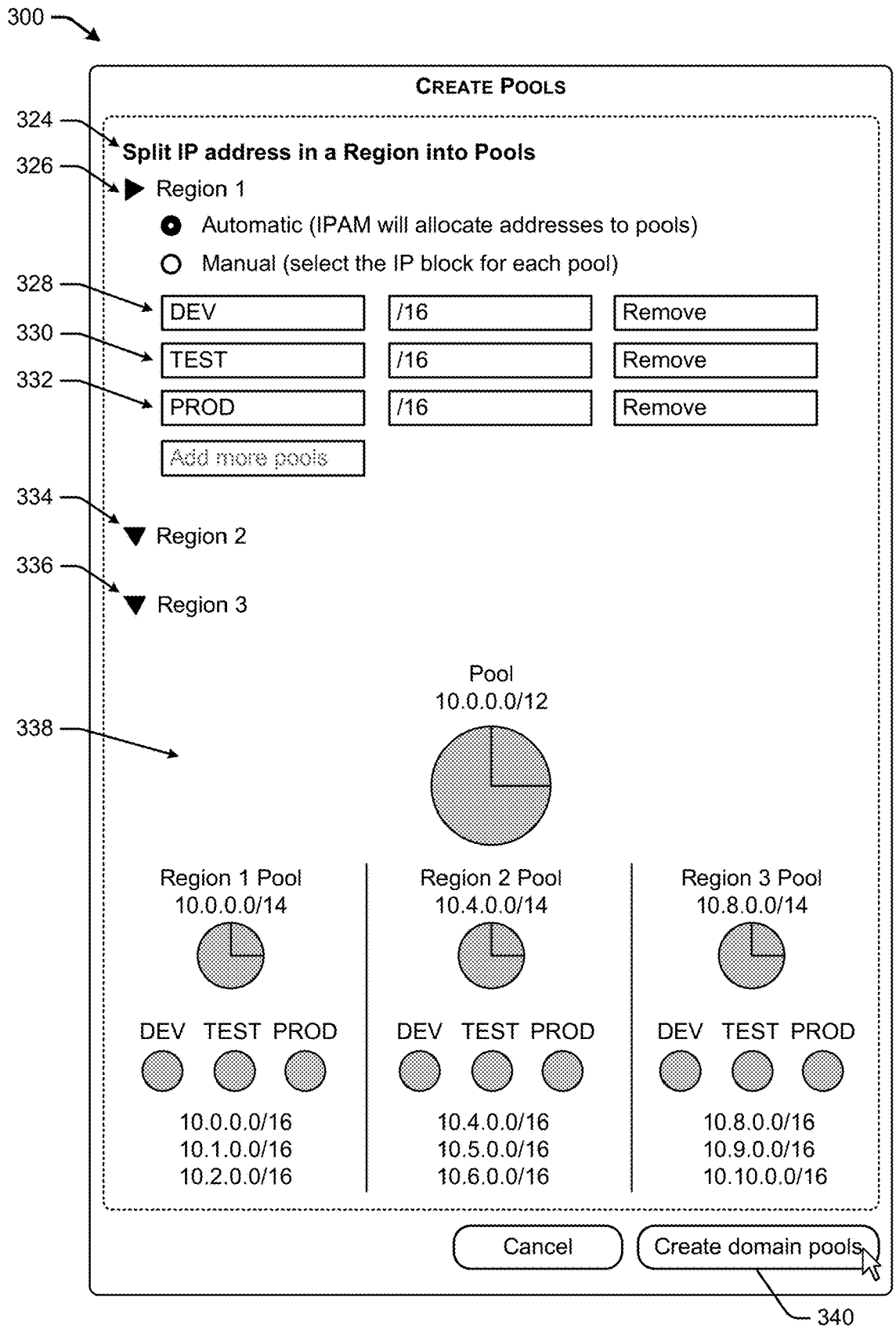
FIG. 3B illustrates a graphical user interface through which an administrator of a network can create root pools of IP addresses.

FIG. 3B illustrates a graphical user interface 300 through which an administrator 112 of a network can create root pools of IP addresses.

At illustrated, the GUI 300 may include a field 324 in which the administrator 112 can split IP address in a region into pools. In the region 1 option 326, the administrator 112 can select the automatic option where the IPAM system 104 may allocated the addresses to the pools. As shown, the administrator 112 has created a developer 328 pool, a testing pool 330, and a production pool 332 that are all sub-pools from the regional pool(s). Additionally, options 334 and 336 are available for the administrator 112 to provide pool input for region 2 and region 3 pools. As illustrated, the GUI 300 may include a pool diagram 338 that illustrates the pools that have been created, and the administrator 112 may select the create domain pools option 340 to create the domain pools that were defined in the GUI 300. In this way, the administrator 112 may see how the pools 118/124 will look in deployment prior to creating the domain pools.

Figure 4:
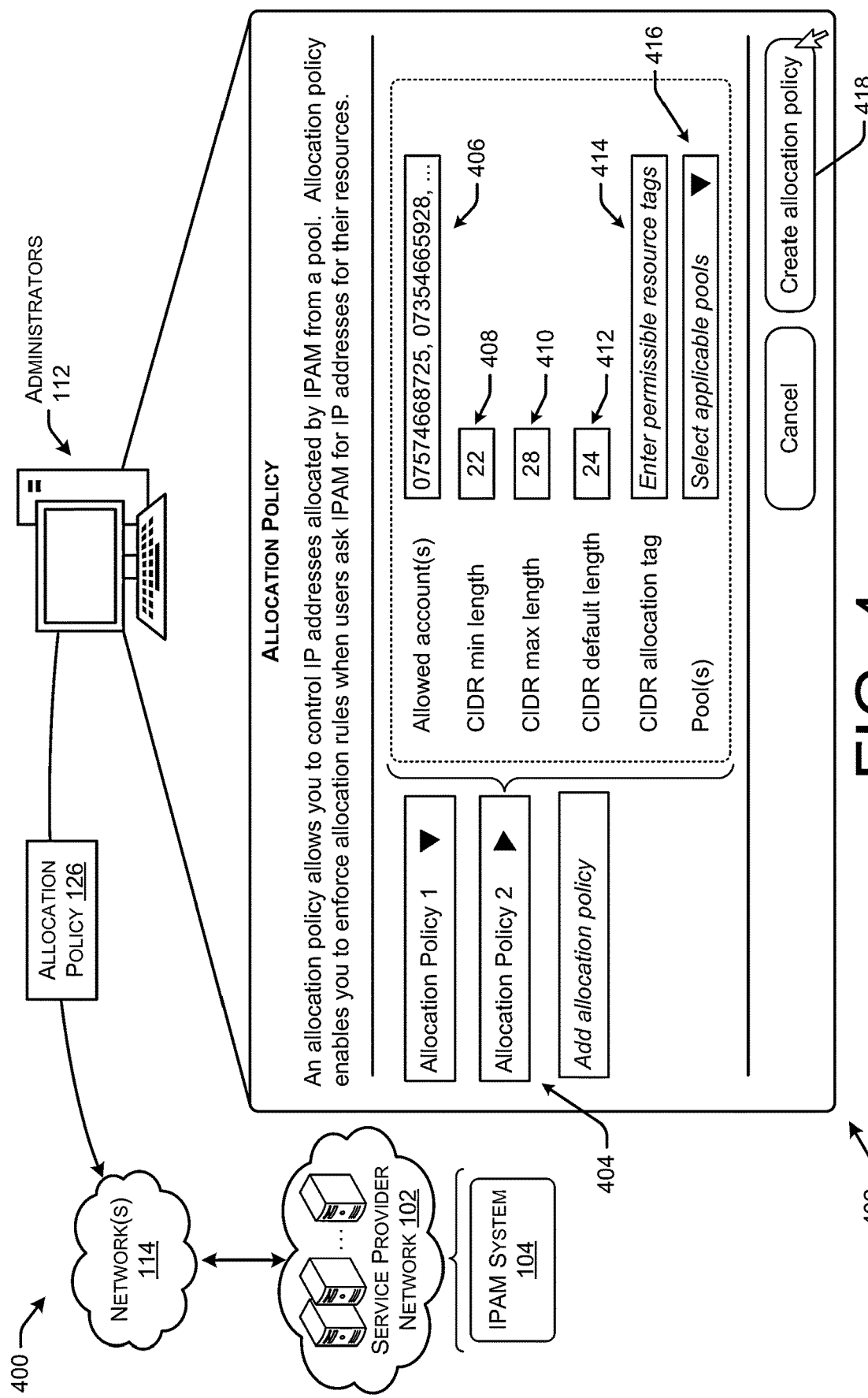
FIG. 4 illustrates a graphical user interface through which an administrator of a network can create an allocation policy for allocating IP addresses to resources.

FIG. 4 illustrates a graphical user interface 402 through which an administrator 112 of a network can create an allocation policy 126 for allocating IP addresses 120 to resources 132.

The user interface 402 can include allocation policy icons 404 that allow the administrator 112 to define different allocation policies 126 that may be allocated to different pools. As shown, the allocation policy may include various rules that define whether requests for IP addresses 120 from pools 118/124 should be allowed or denied. The allocation policy 404 may include an allowed account rule 406 that indicates what accounts are allowed to use IP addresses 120 from the pools. Additionally, the allocation policy may include a CIDR min length field 408, a CIDR max length field 410, and a CIDR default length field 412 where the administrator 112 can set the maximum, minimum, and default lengths of CIDR blocks that can be allocated at once from the pools. Additionally, the allocation policy 404 may include a CIDR allocation tag field 414 that allows the administrator 112 to define what resource tags 136, and thus types of resources 132 (and/or purposes of the resources 132), can use IP addresses 120 from the pools. Additionally, the allocation policy 404 can include a pools field 416 that allows the administrator 112 to define to which pools the allocation policy is assigned. The administrator 112 may then select the create allocation policy option 418, and the allocation policy 126 may be assigned to the appropriate pools and implemented by the IPAM system 104. The allocation policy 126, or policies 126, created by the administrator 112 may then, once created using 418, be send to the IPAM system 104 via the user portal 210, for instance.

Figure 5:
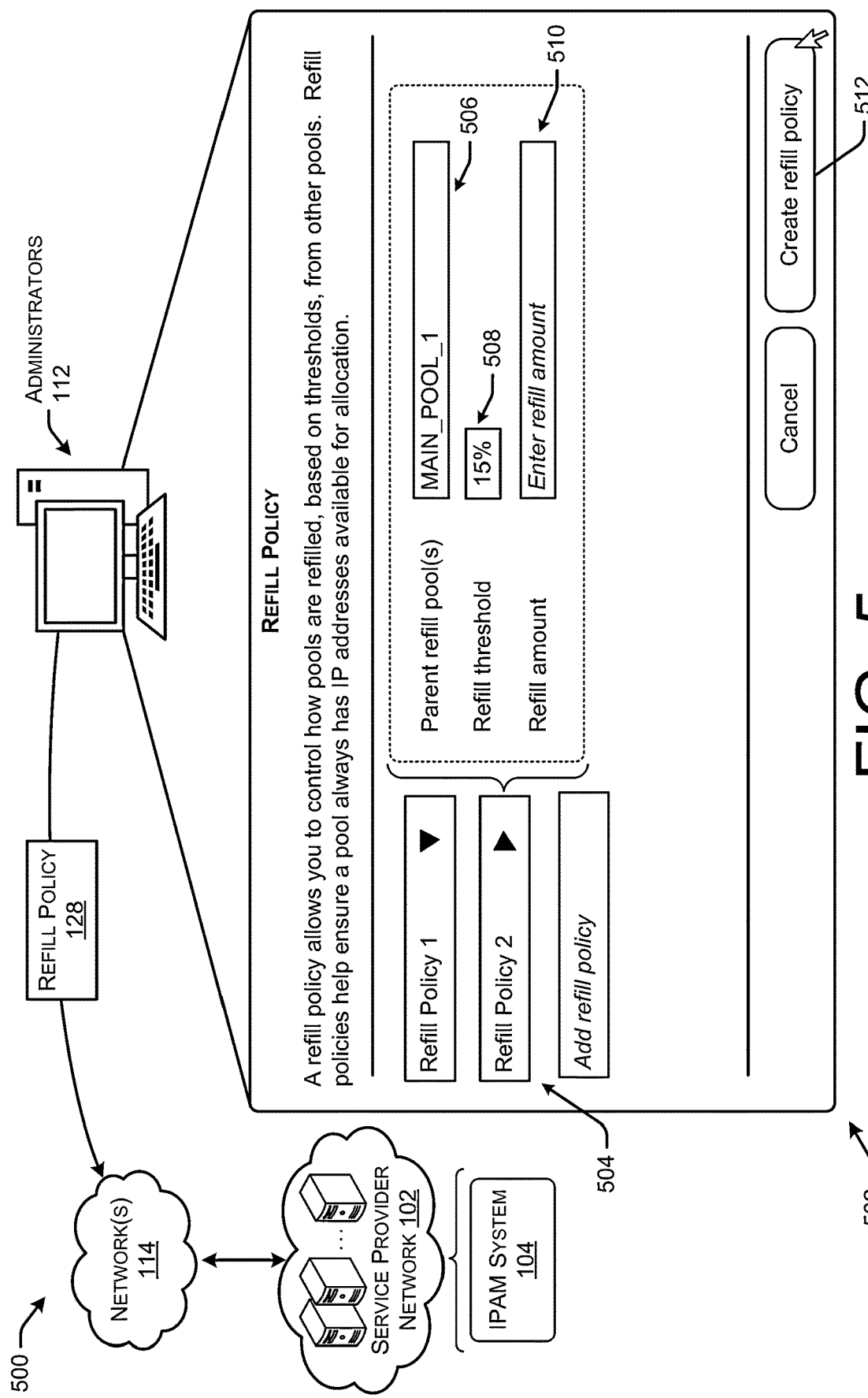
FIG. 5 illustrates a graphical user interface through which an administrator of a network can create a refill policy for refilling IP address inventories for pools of IP addresses.

FIG. 5 illustrates a graphical user interface 502 through which an administrator 112 of a network can create a refill policy 128 for refilling IP address inventories for pools of IP addresses 120.

The user interface 502 may include refill policy options 504 through which an administrator 112 may add and create refill policies 128. The refill policy option 504 may include a parent refill pool(s) option 506 through which the administrator 112 may define from which parent pools 118 the pool 124 refills IP addresses 120. Additionally, the refill policy option 504 may include a refill threshold option 508 through which the administrator 112 may define a threshold (e.g., percentage, number of IP addresses, etc.) that triggers a refill if the inventory of available IP addresses 120 in the pool falls below the threshold 508. Finally, the refill policy option 504 may include a max withdrawal field 514 that the administrator 112 may use to define a maximum amount of IP addresses 120 that can be withdrawn from the pool. The administrator 112 may select the create refill policy option 516 to create the refill policy 128, and the input data defining the refill policy 128 may be provided to or sent to the IPAM system 104.

Figure 6:
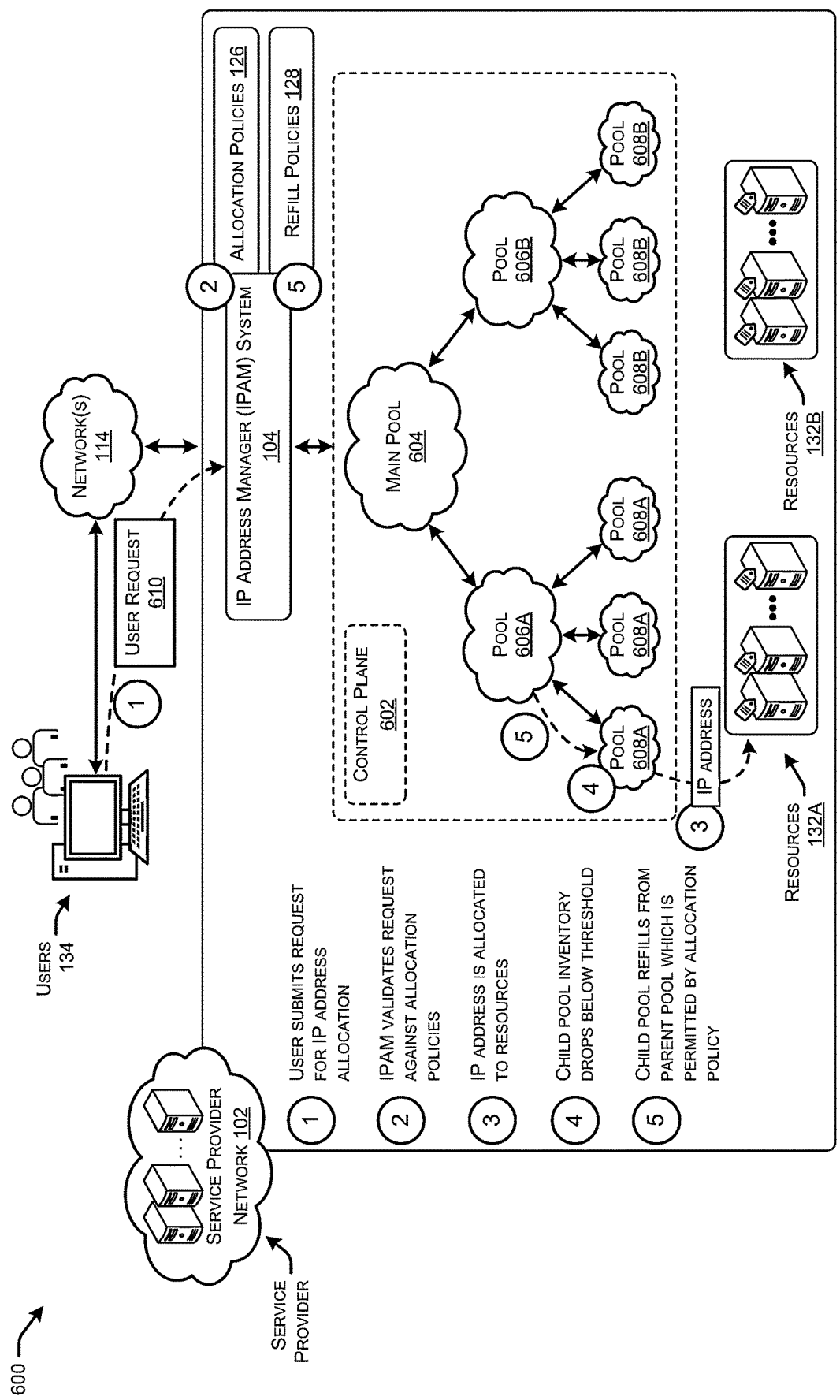
FIG. 6 illustrates a system-architecture diagram of an IPAM service that allocates an IP address to a resource, determines that the pool from which the IP address was allocated has an inventory that drops below a threshold, and refills the pool from a parent pool pursuant to a refill policy.

FIG. 6 illustrates a system-architecture diagram 600 of an IPAM service 104 that allocates an IP address 120 to a resource 132, determines that the pool from which the IP address was allocated has an inventory that drops below a threshold, and refills the pool from a parent pool pursuant to a refill policy.

As illustrated, the IPAM system 104 may manage pools of IP addresses (control plane 602 operations), including a root pool 604, intermediate pools 600A and 600B, and child pools 608A and 608B. At "1," a user 134 may submit a user request for IP address allocation for use on a resource 132. As an example, a user 134 may create a resource, such as a virtual cloud, in the service provider network 102 that requests use of one or more IP addresses 120, such as a CIDR block of IP addresses 120.

At "2," the IPAM system 104 may validate the request against allocation policies 126 (e.g., validate the resource tag 136, validate the purpose, validate the user account, etc.). In some instances, the IPAM system 104 may further determine that the CIDR block requested is less than a threshold amount of IP addresses 120 that are permitted by the allocation policies 126 of the pool 608A.

At "3," the IP address 120 is allocated to the resource 132 based on the user request 610 being validated by the allocation policy 126. For instance, an IP address 120, and potentially a CIDR block, may be allocated to the resource 132. The IPAM system 104 may update the inventory or data structure indicating that the IP addresses 120 has been allocated and/or is reserved for use by the resource 132.

At "4," the IPAM system 104 may determine that the IP address 120 inventory in the child pool 608A has dropped below a threshold indicated by the refill policy 128. For instance, a total number of IP addresses 120 in the pool 608A, a percentage of the IP addresses 120 provided to the pool 608A, and/or a different threshold may be met where the refill policy 128 indicates that the pool 608A is to refill its allocated inventory of IP addresses 120.

At "5," the child pool 608A may refill IP addresses from the parent pool 606A which is specified by the refill policy 128 associated with the pool 606A. Further, an allocation policy 126 defined for the parent pool 606A may indicates that the child pool 608A is permitted to withdraw, or be allocated, IP addresses 120 from the parent pool 606A.

FIGS. 7A, 7B, 8, and 9 illustrate flow diagrams of example methods 700, 800, and 900 that illustrate aspects of the functions performed at least partly by the service provider network 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
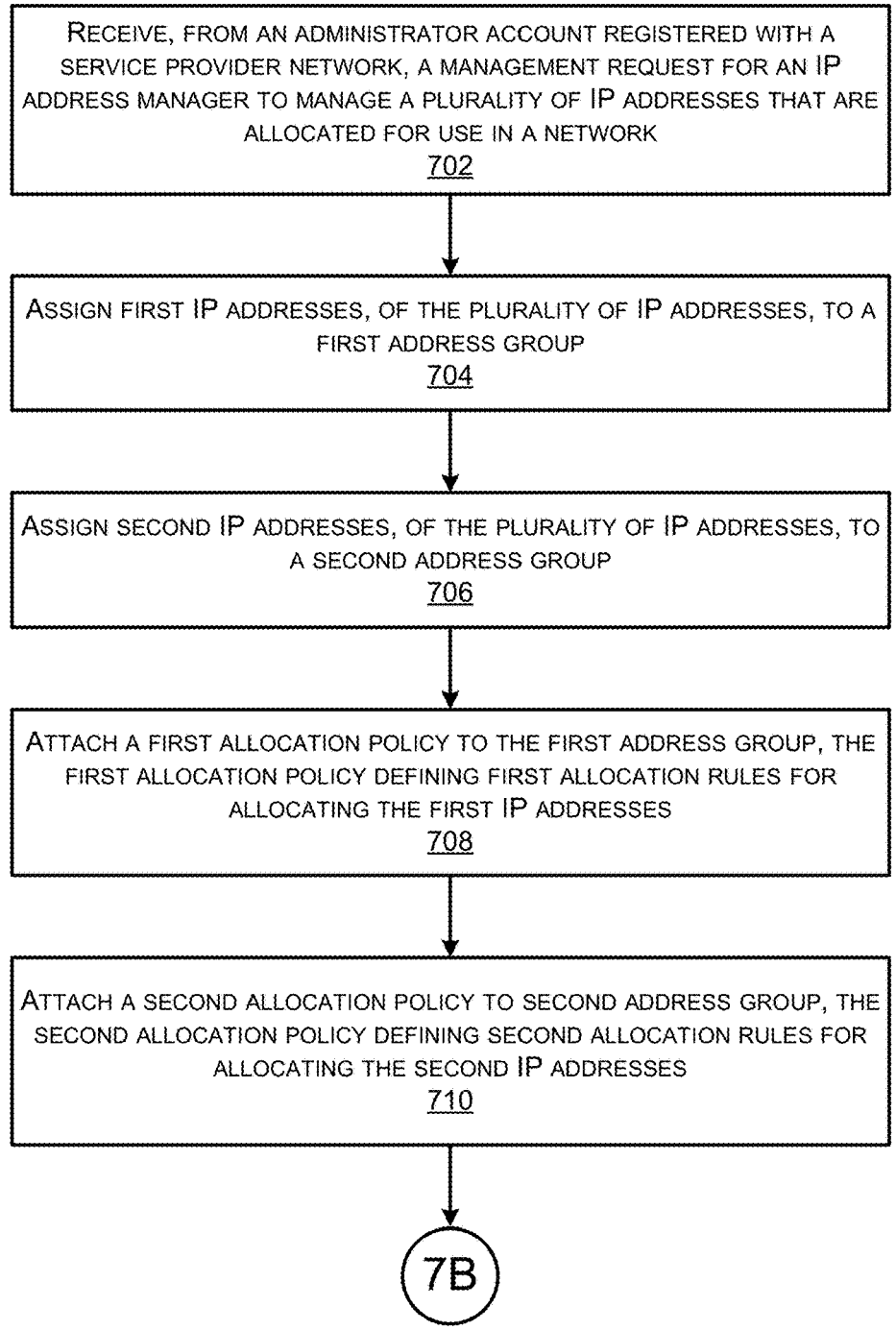
FIGS. 7A and 7B collectively illustrate a flow diagram of an example method for an IPAM system to assign IP addresses to address groups, attach allocation policies to the address groups, and allocate IP addresses from the address group when a request is permissible under an allocation rule.
Figure 7B:
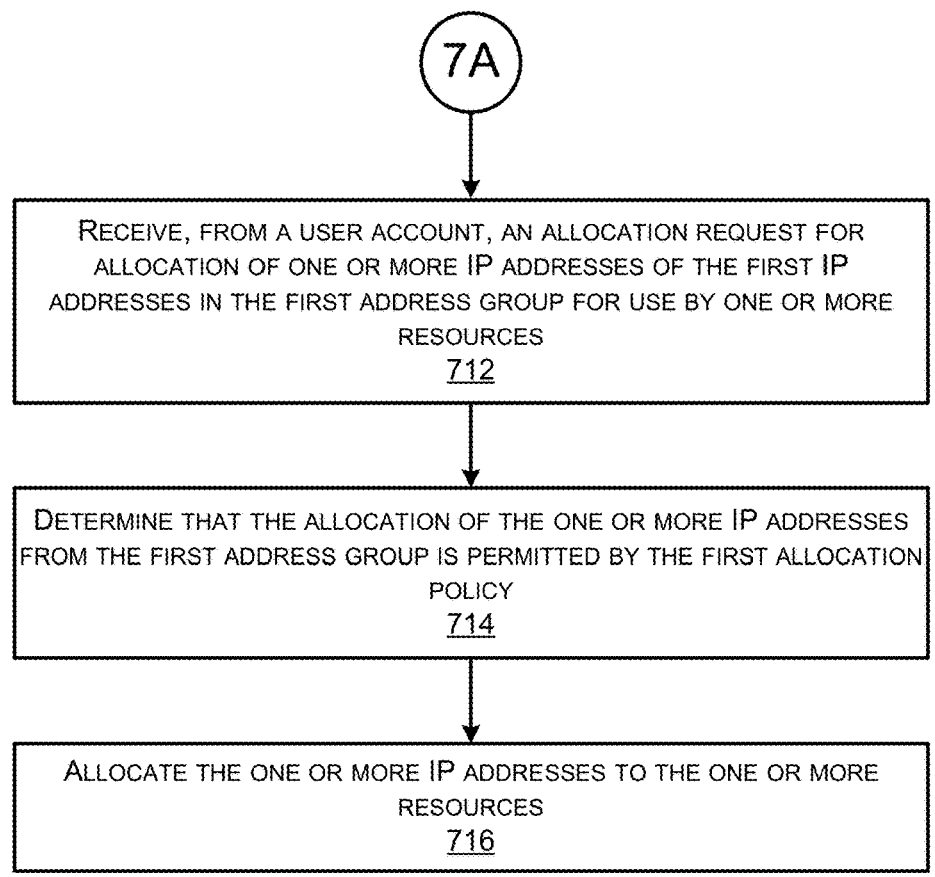

FIGS. 7A and 7B collectively illustrate a flow diagram of an example method 700 for an IPAM system 104 to assign IP addresses 120 to address groups, attach allocation policies to the address groups, and allocate IP addresses from the address group when a request is permissible under an allocation rule.

At 702, the IPAM system 104 may receive, from an administrator account registered with the service provider network, a management request for the IP address manager to manage the plurality of IP addresses that are allocated for use in the network. That is, an administrator 112 may utilize an administration account 230 to enroll in use of the IPAM system 104.

At 704, the IPAM system 104 may assign first IP addresses, of the plurality of IP addresses, to a first address group. For instance, the IPAM system 104 may assign first IP addresses 120 to a first address group (e.g., pool 118/124). Once the first IP addresses 120 are assigned to the first address group, the IP addresses 120 are reserved for use by the first address group such that other address groups are unable to allocate or use those IP addresses 120.

At 706, the IPAM system 104 may assign second IP addresses, of the plurality of IP addresses, to a second address group. For instance, the IPAM system 104 may assign second IP addresses 120 to a second address group (e.g., pool 118/124).

At 708, the IPAM system 104 may attach a first allocation policy to the first address group. Generally, the first allocation policy 126 may define first allocation rules for allocating the first IP addresses 120 to user accounts 230 and/or resources 132.

At 710, the IPAM system 104 may attach a second allocation policy to second address group, the second allocation policy defining second allocation rules for allocating the second IP addresses.

At 712, the IPAM system 104 may receive, from a user account, an allocation request for allocation of one or more IP addresses of the first IP addresses in the first address group for use by one or more resources. In some instances, the user account 230 may have created a new resource 132 that requires use of the one or more IP addresses 120. In some instances, however, the allocation request may come from another entity other than a user account 230, such as an application, program or system, group of user accounts, and so forth.

At 714, the IPAM system 104 may determine that the allocation of the one or more IP addresses from the first address group is permitted by the first allocation policy. For instance, the IPAM system 104 may determine that a number of IP addresses 120 requested is permitted by the first allocation policy 126, the user account 230 (or other entity) has permissions that indicate they are allowed to use the first IP addresses 120 from the first address group, and/or use other techniques described herein.

At 716, the IPAM system 104 may allocate the one or more IP addresses to the one or more resources. For instance, the IPAM system 104 may provide the resources 132 with an indication that the one or more IP addresses 120 may be used by them, and may further store, in an inventory data structure, and indication that the one or more IP addresses 120 are reserved for use by the one or more resource 132 and are no longer available for allocation.

Figure 8:
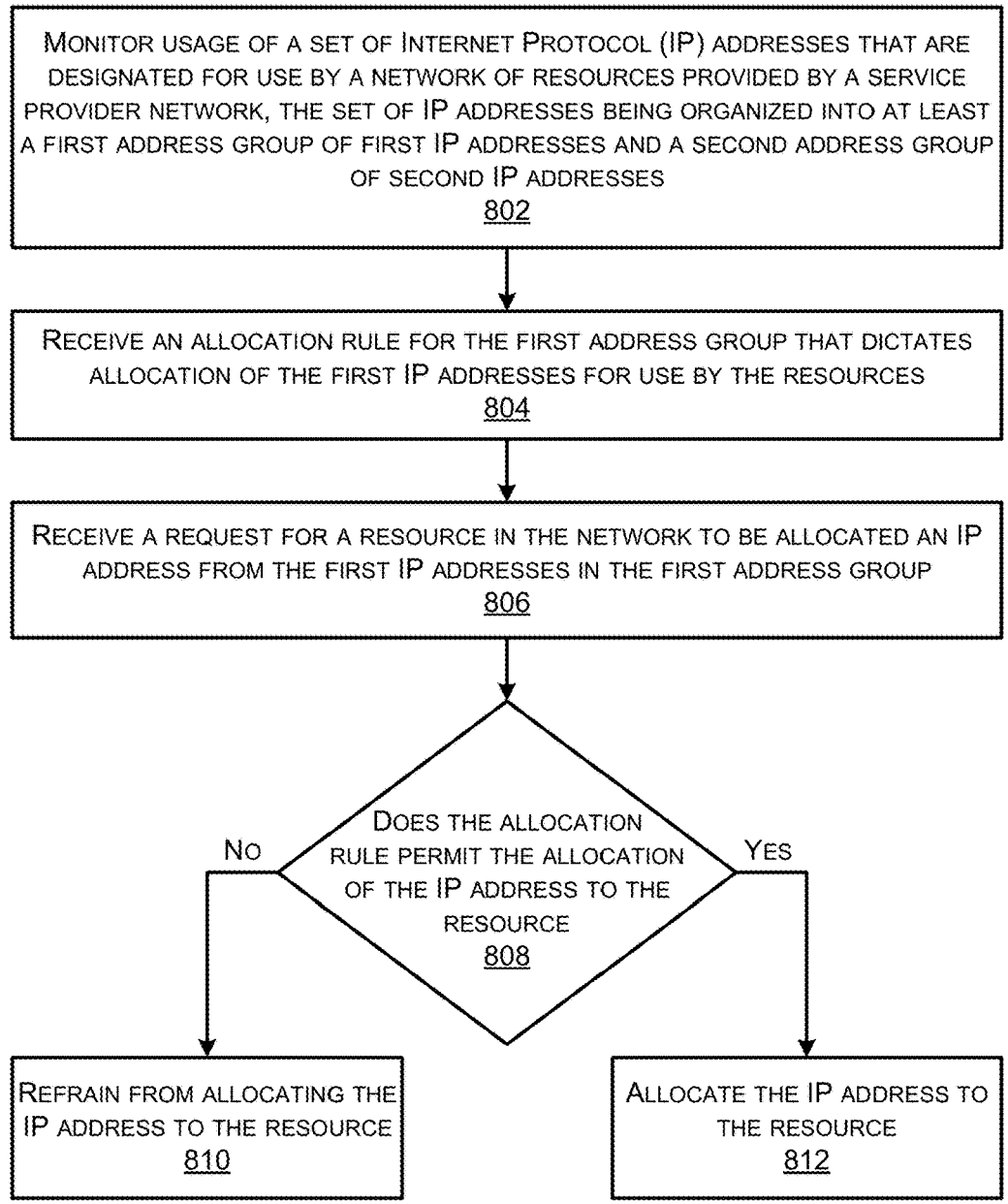
FIG. 8 illustrates a flow diagram of an example method for an IPAM system to either allocate, or refrain from allocating, an IP address for use by a resource based on an allocation rule.

FIG. 8 illustrates a flow diagram of an example method 800 for an IPAM system 104 to either allocate, or refrain from allocating, an IP address for use by a resource based on an allocation rule.

At 802, the IPAM system 104 may monitor usage of a set of Internet Protocol (IP) addresses that are designated for use by a network of resources 132 provided by a service provider network 102 where the set of IP addresses 120 are organized into at least a first address group (e.g., pool 118/124) of first IP addresses 120 and a second address group (e.g., pool 118/124) of second IP addresses 120.

At 804, the IPAM system 104 receive an allocation rule for the first address group that dictates allocation of the first IP addresses for use by the resources. For instance, an administrator 112 may use a user interface 402 to define the first allocation policy/rule 126.

At 806, the IPAM system 104 may receive a request for a resource in the network to be allocated an IP address from the first IP addresses in the first address group. In some instances, the request may be received from an entity (e.g., application, user account 230, resource 132, etc.) that has been provided or granted one or more permissions associated with managing the network.

At 808, the IPAM system 104 may determine whether the allocation rule permits the allocation of the IP address to the resource. For instance, the IPAM system 104 may determine whether that the entity is permitted under the allocation rule 126 to use the first IP addresses 120 in the first address group based at least in part on the permissions. As another example, the IPAM system 104 may determine or identify a resource tag 136 assigned to the resource 132 and determine, using the resource tag 136, whether the resource 132 is permitted under the allocation rule 126 for use of the first IP addresses 120. The resource tag 136 may indicate a purpose of the resource 132, an entity that owns or manages the resource 132, a resource type of the resource 132, a region in which the resource 132 resides, and/or other information associated with the resource 132. The IPAM system 104 may utilize this information, and/or potentially other information, to determine whether the resource 132 is permitted use of the IP address 120.

At 812, the IPAM system 104 may, in response to determining that the allocation rule permits the allocation, allocate the IP address to the resource. For instance, the IPAM system 104 may notify the resource 132 that it is permitted use of the IP address 120, and may further store an indication in a data structure that the IP address 120 is no longer available for allocation and is assigned to the resource 132. Alternatively, at 810, the IPAM system 104 may, in response to determining that the allocation rule does not permit the allocation, refrain from allocating the IP address to the resource.

Figure 9:
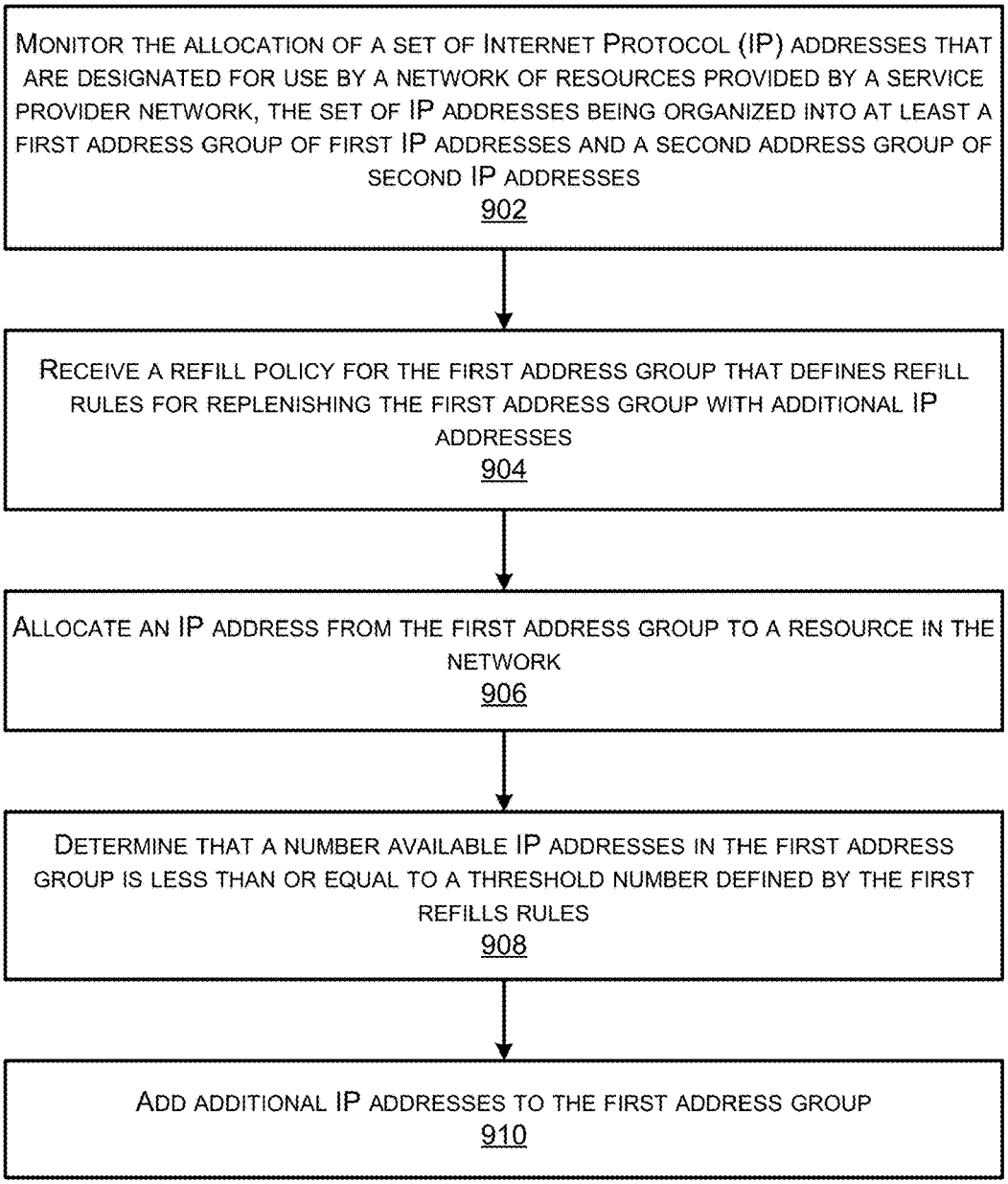
FIG. 9 illustrates a flow diagram of an example method for an IPAM system to add IP addresses to an address group that has an inventory of available IP addresses fall below a threshold defined by a refill policy.

FIG. 9 illustrates a flow diagram of an example method 900 for an IPAM system 104 to add IP addresses to an address group that has an inventory of available IP addresses fall below a threshold defined by a refill policy.

At 902, the IPAM system 104 may monitor the allocation of a set of Internet Protocol (IP) addresses that are designated for use by a network of resources provided by a service provider network, the set of IP addresses being organized into at least a first address group (e.g., pool 118/124) of first IP addresses and a second address group (e.g., pool 118/124) of second IP addresses. For instance, the IPAM system 104 may track what IP addresses 120 have been allocated from the address groups (e.g., pools 118/124), and what IP addresses 120 assigned to the address groups are still available for allocation.

At 904, the IPAM system 104 may receive a refill policy for the first address group that defines refill rules for replenishing the first address group with additional IP addresses. For instance, an administrator 112 may use a user interface 502 to provide input that defines a refill policy 128, and/or a refill rule, that dictates how the first address group is refilled or replenishes with additional IP addresses 120 for use in allocating to resources 132.

At 906, the IPAM system 104 allocate an IP address from the first address group to a resource in the network. For instance, the IPAM system 104 may determine that the resource 132 is permitted use of an IP address 120 from the first address group under an allocation policy 126 assigned to the first address group.

At 908, the IPAM system 104 may determine that a number available IP addresses in the first address group is less than or equal to a threshold number defined by the first refills rules. For instance, the IPAM system 104 may use a refill policy 128 to determine that less than a threshold number of IP addresses 120 (e.g., less than 1,000, less than 1,000, etc.) are available in the first address group, less than a threshold percentage of IP addresses 120 are available (e.g., less than 15%, less than 20%, etc.), and so forth.

At 910, the IPAM system 104 add additional IP addresses to the first address group. In some instances, the IPAM system 104 may analyze the refill policy 128 and determine that a third address group is designated as the address group from which the first address group is allocated IP addresses 120.

Figure 10:
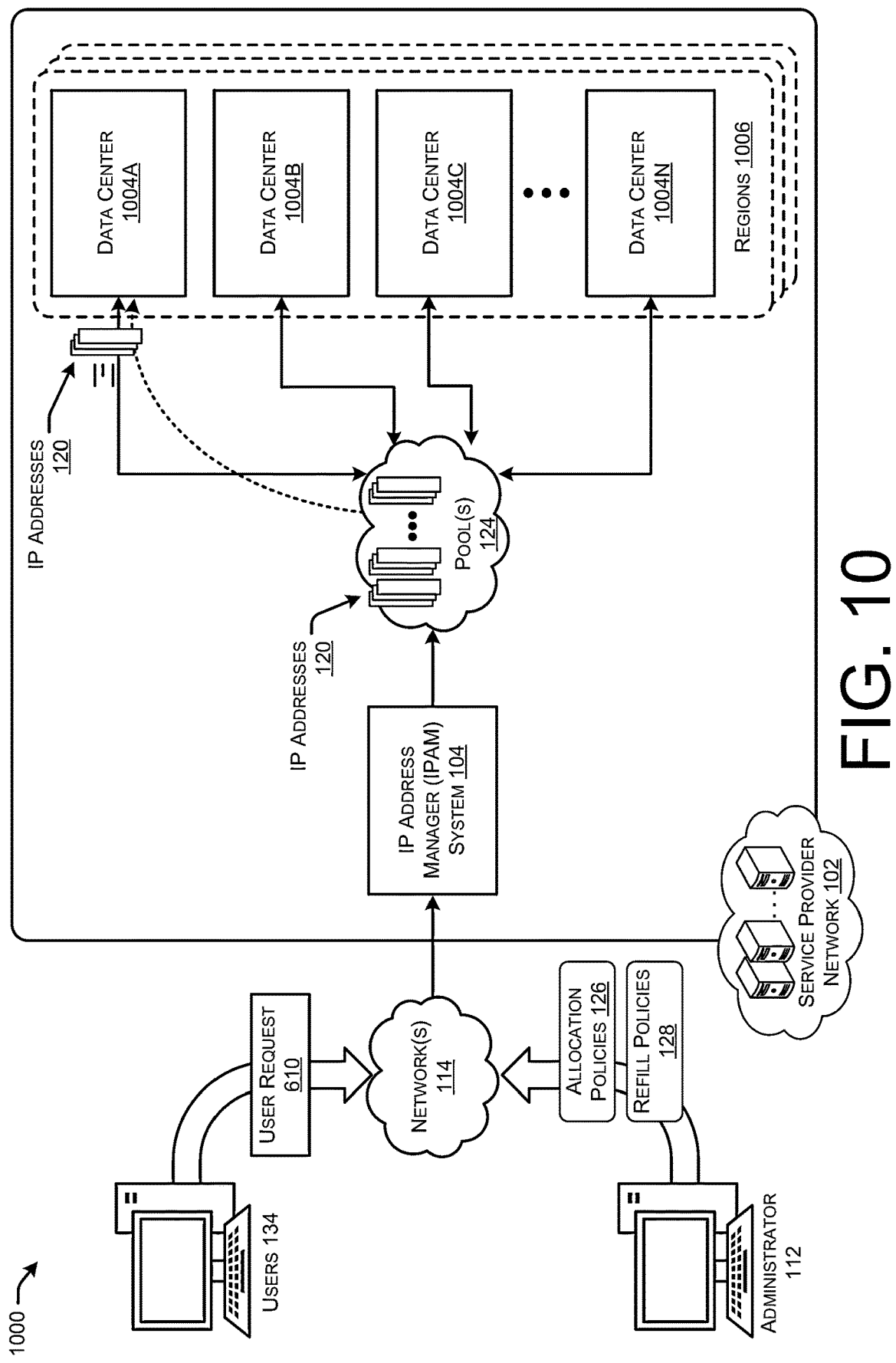
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 134 of the user devices 108 that utilize the service provider network 134 may access the computing resources provided by the service provider network 102 over any wired and/or wireless network(s) 114, which can be a wide area communication network ("WAN"), such as the Internet, an intranet or an Internet service provider ("ISP") network or a combination of such networks. For example, and without limitation, a user device 108 operated by a user 134 of the service provider network 102 may be utilized to access the service provider network 102 by way of the network(s) 114. It should be appreciated that a local-area network ("LAN"), the Internet, or any other networking topology known in the art that connects the data centers 1004 to remote clients and other users can be utilized. It should also be appreciated that combinations of such networks can also be utilized.

In some instances, the data centers 1004 may each house resources, such as the resources 132, that are provided IP addresses 120 according to the techniques described herein.

Figure 11:
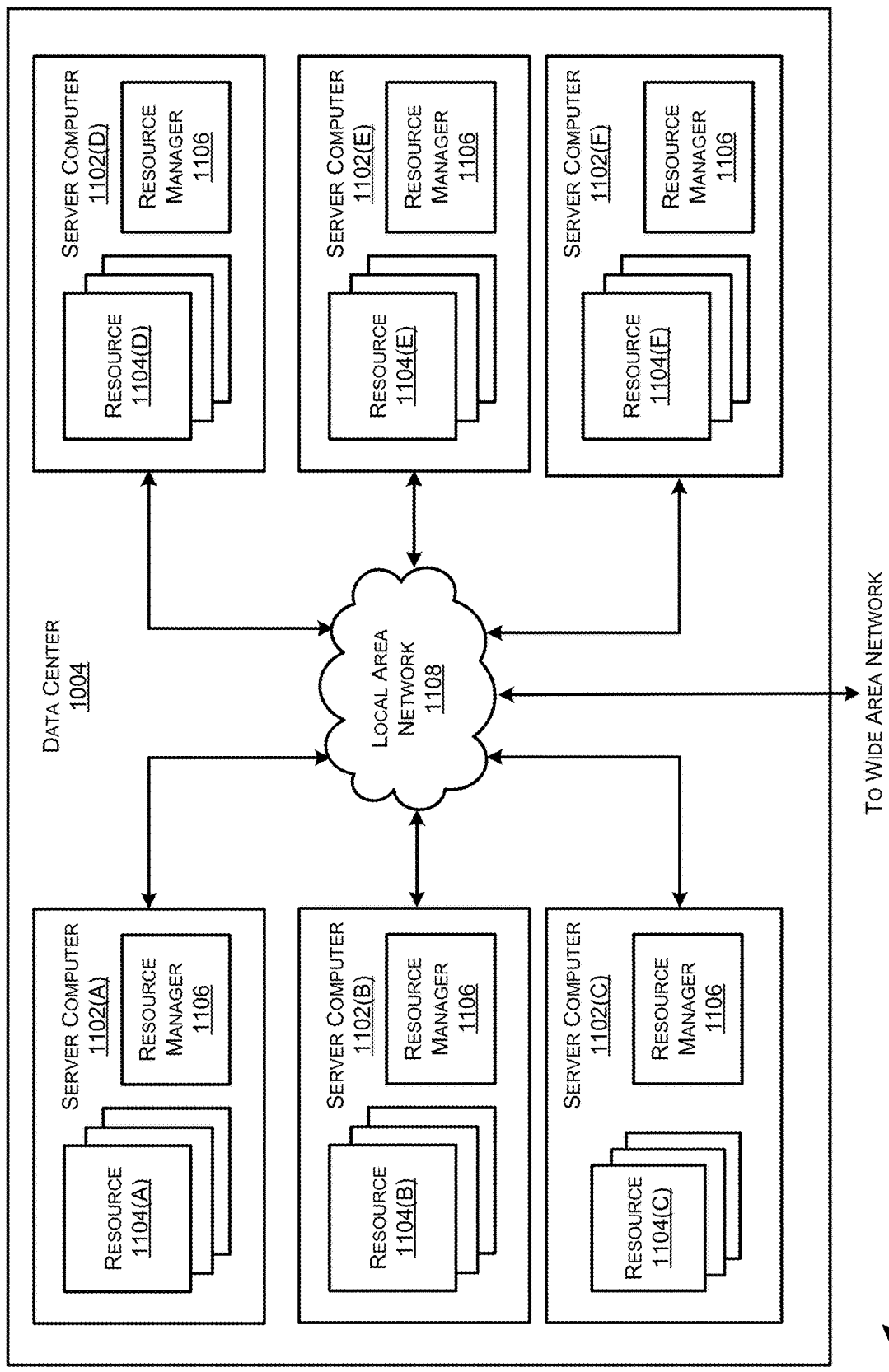
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices 112 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

In some examples, the resources 1104 may be included as examples of the resources 132 described herein.

Figure 12:
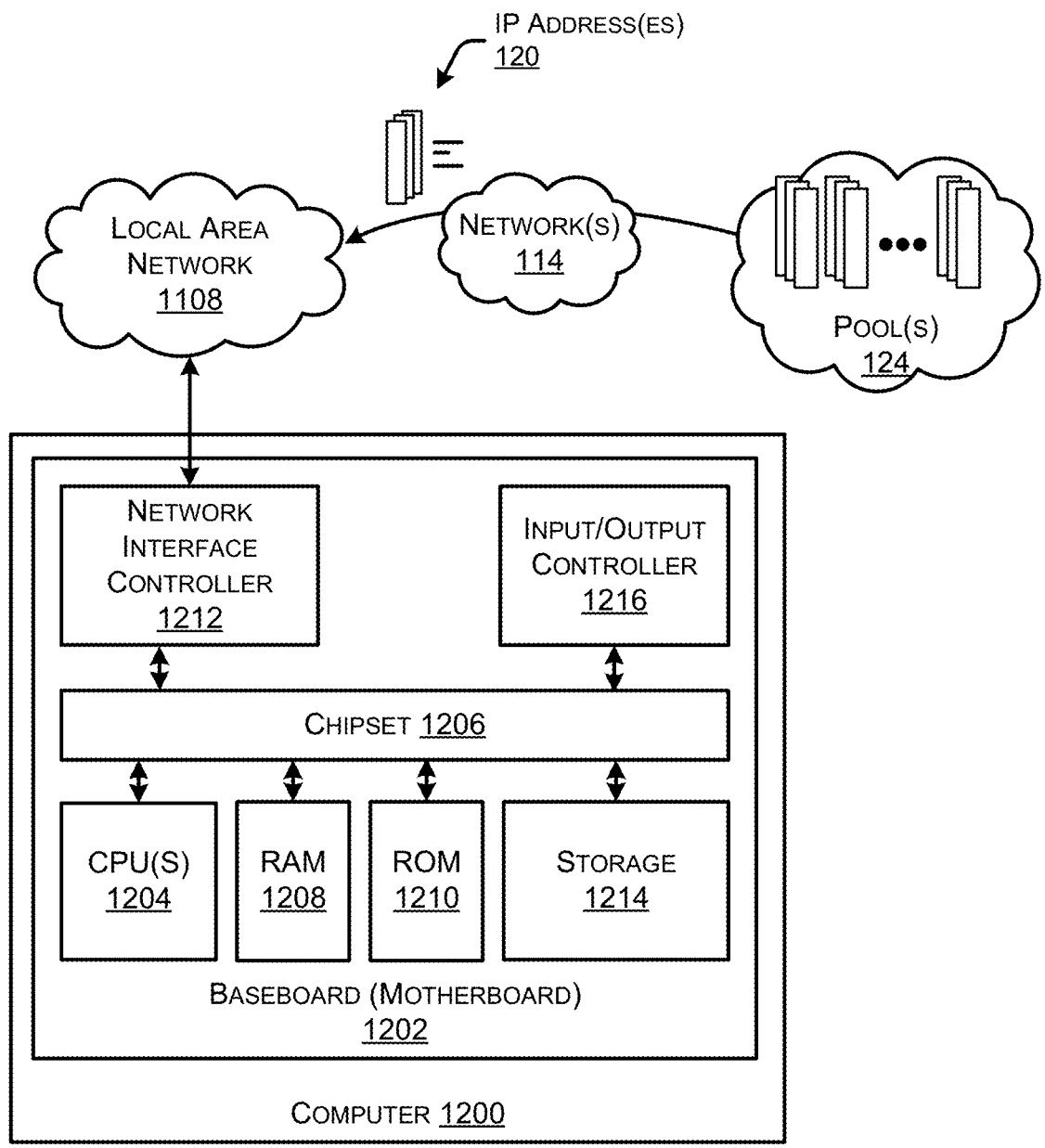
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 114). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for an Internet Protocol (IP) address manager to manage allocation of a plurality of IP addresses to resources in a first virtual network and a second virtual network of a cloud provider network, the method comprising:
   receiving, from an administrator account registered with the cloud provider network, a management request for the IP address manager to manage the plurality of IP addresses that are allocated for use in the first virtual network and the second virtual network, the first virtual network and second virtual network being registered with the administrator account;
   assigning first IP addresses, of the plurality of IP addresses, to a first address group that is assigned to the first virtual network, the first virtual network being disposed in a first geographic region of the cloud provider network;
   assigning second IP addresses, of the plurality of IP addresses, to a second address group that is assigned to the second virtual network, the second virtual network being disposed in a second geographic region of the cloud provider network;
   receiving, from the administrator account, input defining (i) a first allocation policy that defines first allocation rules for allocating the first IP addresses and (ii) a group of user accounts that are permitted to allocate the first IP addresses to computing resources located in the first virtual network;
   attaching the first allocation policy to the first address group;
   attaching a second allocation policy to second address group, the second allocation policy defining second allocation rules for allocating the second IP addresses in the second virtual network;
   receiving, from a user account, an allocation request for allocation of one or more IP addresses of the first IP addresses in the first address group for use by one or more resources deployed in the first virtual resource network;
   determining that a resource type of the one or more resources has a purpose that is permitted under the first allocation rules for use of the first IP addresses;
   determining that the user account is included in the group of user accounts that are permitted to allocate the first IP addresses to the computing resources located in the first virtual network according to the first allocation policy;
   determining, based at least in part on the user account being permitted to allocate the first IP addresses to the computing resources located in the first virtual network, that the allocation of the one or more IP addresses from the first address group is permitted by the first allocation policy; and
   allocating the one or more IP addresses to the one or more resources located in the first virtual network.

2. The method of claim 1, wherein determining that the allocation of the one or more IP addresses from the first address group is permitted further includes determining that a number of the one or more IP addresses requested for use is less than or equal to an allocation limit defined by the first allocation rules.

3. The method of claim 1, further comprising:
   attaching a refill policy to the first address group, the refill policy defining refill rules for adding IP addresses to the first address group;
   determining that a number of available IP addresses in the first address group is less than or equal to a threshold number defined by the first refill policy; and
   adding additional available IP addresses to the first address group.

4. The method of claim 1, further comprising:
   monitoring a set of the first IP addresses that are assigned to resources in the network;
   determining that a particular IP address of the set of the first IP addresses is non-compliant with the first allocation policy; and
   outputting an alert to the administrator account indicating that the particular IP address is non-compliant.

5. A system comprising:
   one or more processors; and
   one or more computer-readable media storing computer-executable instructions that, when executed by the one or more processors, cause the one or more processors to perform operations comprising:
   monitoring usage of a set of Internet Protocol (IP) addresses that are designated for use by a network of resources provided by a service provider network, the set of IP addresses being organized into at least a first address group of first IP addresses and a second address group of second IP addresses;

receiving an allocation policy for the first address group that dictates allocation of the first IP addresses for use by the resources;

attaching a refill policy to the first address group, the refill policy defining refill rules for adding IP addresses to the first address group;

receiving, from a user account associated with the network, a request for one or more resources in the network to be allocated a plurality of IP addresses from the first IP addresses in the first address group;

determining whether the allocation policy permits the allocation of the plurality of IP addresses to the one or more resources;

determining that the refill policy indicates that additional available IP addresses are to be added from a third address group; and in response to determining that the allocation policy permits the allocation:
  allocating the plurality of IP addresses to the one or more resources; and
  adding the additional available IP addresses to the first address group and from the third address group.

6. The system of claim 5, wherein:

the request was submitted by an entity associated with the service provider network, wherein the entity is granted permissions associated with managing the network; and determining whether the allocation policy permits the allocation of the plurality of IP addresses includes determining whether the entity is permitted under the allocation policy to use the first IP addresses in the first address group based at least in part on the permissions.

7. The system of claim 5, the operations further comprising:

identifying a resource tag assigned to the resource, wherein determining whether the allocation policy permits the allocation of the plurality of IP addresses includes determining, using the resource tag, whether the one or more resources are permitted under the allocation policy for use of the first IP addresses.

8. The system of claim 5, the operations further comprising:

monitoring a particular IP address of the first IP addresses that is assigned to a particular resource;

determining that the particular IP address is non-compliant with the allocation policy; and outputting, to an administrative account associated with the network, an alert indicating that the particular IP address is non-compliant.

9. The system of claim 5, the operations further comprising:

detecting an unknown IP address that is assigned to a resource in the network;

determining that the unknown IP address falls into an IP address range assigned to the first address group; and assigning the unknown IP address to the first address group.

10. The system of claim 5, wherein an IP address of the plurality of IP addresses is a released IP address that was released from use by another resource in the network, the operations further comprising:

refraining from reallocating the released IP address for a period of time after being released; and in response to determining that the allocation policy permits the allocation, allocating the released IP address to the one or more resources based at least partly on the period of time lapsing.

11. The system of claim 5, the operations further comprising:

determining that a number of available IP addresses in the first address group is less than or equal to a threshold number defined by the first refill policy; and adding additional available IP addresses to the first address group.

12. The system of claim 5, the operations further comprising:

determining that a resource type of the one or more resources is permitted use of the first IP addresses under the allocation policy.

13. The system of claim 5, the operations further comprising:

determining a purpose of the one or more resources in the network;

determining that the allocation policy allows for the additional IP addresses to be allocated to resources having the purpose in the network; and in response to determining that the allocation policy allows for the additional IP addresses to be allocated to resources having the purpose in the network, allocating the plurality of IP addresses to the one or more resources.

14. A method comprising:

monitoring allocations of a set of Internet Protocol (IP) addresses that are designated for use by a network of resources provided by a service provider network, the set of IP addresses being organized into at least a first address group of first IP addresses and a second address group of second IP addresses;

receiving a refill policy for the first address group that defines a refill rule for replenishing the first address group with additional IP addresses;

allocating an IP address from the first address group to a resource in the network;

determining that a number of available IP addresses in the first address group is less than or equal to a threshold number defined by the refill rule, the threshold number being greater than zero available IP addresses;

determining that the refill policy indicates that additional IP addresses are to be added to the first address group from a third address group, identifying a second refill policy, associated with the third address group, that defines a maximum number of available IP addresses that are permitted to be taken from the third address group;

determining that a number of the additional IP addresses that are to be added to the first address group is less than the maximum number;

identifying a previous allocation of additional IP addresses from the third address group and to the first address group;

determining, using at least the previous allocation, a frequency at which the first address group requests allocations from the third address group;

determining that the frequency is less than or equal to a permissible frequency; and adding the additional IP addresses to the first address group based at least in part on the number of the additional IP addresses being less than the maximum number.

15. The method of claim 14, further comprising:

receiving an allocation rule for the first address group that dictates allocation of the first IP addresses for use by the resources;

receiving, from an entity associated with the service provider network, a request for the resource to be allocated the IP address; and determining, based at least in part on a set of permissions allocated to the entity, that the entity is permitted under the allocation rule to use the first IP addresses in the first address group.

16. The method of claim 14, further comprising:

receiving an allocation rule for the first address group that dictates allocation of the first IP addresses for use by the resources;

identifying a resource tag assigned to the resource; and determining, using the resource tag, that the resource is permitted under the allocation rule for use of the first IP addresses.

17. The method of claim 14, further comprising:

receiving an allocation rule for the first address group that dictates allocation of the first IP addresses for use by the resources;

monitoring a particular IP address of the first IP addresses that is assigned to a particular resource;

determining that the particular IP address is non-compliant with the allocation rule; and outputting, to an administrative account associated with the network, an alert indicating that the particular IP address is non-compliant.

18. The method of claim 14, further comprising:

detecting an unknown IP address that is assigned to a resource in the network;

determining that the unknown IP address falls into an IP address range assigned to the first address group; and assigning the unknown IP address to the first address group.

* * * * *